(12) United States Patent
Bhargava et al.

(10) Patent No.: US 10,840,748 B2
(45) Date of Patent: Nov. 17, 2020

(54) INDUCTIVELY COUPLED POWER TRANSFER SYSTEMS

(71) Applicant: Apple Inc., Cupertino, CA (US)

(72) Inventors: Kunal Bhargava, Auckland (NZ); Fady Mishriki, Auckland (NZ); Saining Ren, Auckland (NZ); Daniel Robertson, Auckland (NZ); Nigel James Gray, Auckland (NZ); Rex Huang, Auckland (NZ)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 14/440,456

(22) PCT Filed: Nov. 5, 2013

(86) PCT No.: PCT/NZ2013/000196
§ 371 (c)(1),
(2) Date: May 4, 2015

(87) PCT Pub. No.: WO2014/070026
PCT Pub. Date: May 8, 2014

(65) Prior Publication Data
US 2015/0318730 A1    Nov. 5, 2015

Related U.S. Application Data

(60) Provisional application No. 61/722,564, filed on Nov. 5, 2012.

(51) Int. Cl.
*H02J 50/90*    (2016.01)
*H01F 38/14*    (2006.01)
(Continued)

(52) U.S. Cl.
CPC ............ *H02J 50/90* (2016.02); *H01F 38/14* (2013.01); *H02J 5/005* (2013.01); *H02J 7/025* (2013.01); *H02J 50/10* (2016.02); *H02J 50/40* (2016.02)

(58) Field of Classification Search
CPC .. H02J 7/025; H02J 5/005; H02J 50/80; H02J 7/0042; H02J 7/00; H02J 50/10;
(Continued)

(56) References Cited

U.S. PATENT DOCUMENTS 4,960,983 A    10/1990    Inoue
5,850,135 A    12/1998    Kuki et al.
(Continued)

FOREIGN PATENT DOCUMENTS

CN    1954472 A    4/2007
CN    101375483 A    2/2009
(Continued)

OTHER PUBLICATIONS

International Search Report for International Application No. PCT/NZ2013/000196 dated Apr. 15, 2014 (3 pages).
(Continued)

*Primary Examiner* — Drew A Dunn
*Assistant Examiner* — Sailesh Thapa
(74) *Attorney, Agent, or Firm* — Blank Rome LLP

(57) ABSTRACT

In an inductively coupled power transmitter a force detector that detects the presence of a potential device by monitoring forces applied to a surface of the power transmitter and activates the inductively coupled power transmitter upon detection of a potential device. An inductively coupled power transmitter having a proximity detector that detects the presence and location of a potential device by monitoring the proximity of devices to a surface of the power transmitter and activates the inductively coupled power
(Continued)

transmitter upon detection of a potential device. The transmitter preferably has one or more detection coils each having an area much greater than that of the transmitter coils for detecting the presence of a potential device. An inductively coupled power transmitter including a plurality of transmitter coils proximate a charging surface and a controller selecting and driving a combination of transmitter coils providing the coupling between the power transmitter and a power receiver meeting a selection criteria.

15 Claims, 7 Drawing Sheets

(51) Int. Cl.
  *H02J 50/10* (2016.01)
  *H02J 50/40* (2016.01)
  *H02J 5/00* (2016.01)
  *H02J 7/02* (2016.01)

(58) Field of Classification Search
  CPC .. H02J 50/12; H02J 50/90; H02J 11/00; H02J 15/00; H02J 2207/20; H02J 2207/40; H02J 2310/10; H02J 2310/14; H02J 2310/44; H02J 3/14; H02J 3/32; H02J 4/00; H02J 50/005; H02J 50/20; H02J 50/23; H02J 50/40; H02J 7/00034; H02J 7/0045; H02J 7/0047; H02J 7/007; H02J 7/00714; H02J 7/045
  USPC .......................................................... 320/108
  See application file for complete search history.

(56) References Cited

U.S. PATENT DOCUMENTS

| | | | |
|---|---|---|---|
| 6,157,162 A | 12/2000 | Hayashi et al. | |
| 6,219,267 B1 | 4/2001 | Andres | |
| 7,650,192 B2 | 1/2010 | Wahlstrand | |
| 9,735,626 B2 * | 8/2017 | Hyodo | H02J 50/80 |
| 2005/0068019 A1 | 3/2005 | Nakamara et al. | |
| 2005/0116683 A1 * | 6/2005 | Cheng | H01F 3/02 |
| | | | 320/108 |
| 2006/0071632 A1 * | 4/2006 | Ghabra | H02J 50/12 |
| | | | 320/108 |
| 2007/0131505 A1 | 6/2007 | Kim | |
| 2007/0049997 A1 | 8/2007 | Partovi | |
| 2007/0182367 A1 | 8/2007 | Partovi | |
| 2007/0228833 A1 | 10/2007 | Stevens et al. | |
| 2009/0001932 A1 | 1/2009 | Kamijo et al. | |
| 2009/0033280 A1 * | 2/2009 | Choi | H02J 7/025 |
| | | | 320/108 |
| 2009/0079270 A1 | 3/2009 | Jin | |
| 2009/0174264 A1 | 7/2009 | Onishi et al. | |
| 2010/0114253 A1 * | 5/2010 | Wahlstrand | A61M 5/14276 |
| | | | 607/61 |
| 2011/0049997 A1 | 3/2011 | Urano | |
| 2011/0089768 A1 | 4/2011 | Byrne et al. | |
| 2011/0128714 A1 * | 6/2011 | Terao | H02J 7/025 |
| | | | 361/807 |
| 2011/0196544 A1 | 8/2011 | Baarman et al. | |
| 2012/0139358 A1 * | 6/2012 | Teggatz | H01F 38/14 |
| | | | 307/104 |
| 2012/0223589 A1 | 9/2012 | Low et al. | |
| 2012/0313579 A1 * | 12/2012 | Matsumoto | H02J 5/005 |
| | | | 320/108 |
| 2013/0030892 A1 | 1/2013 | Liu et al. | |
| 2013/0119773 A1 * | 5/2013 | Davis | H02J 5/005 |
| | | | 307/104 |
| 2013/0127259 A1 * | 5/2013 | Lohr | H01F 38/14 |
| | | | 307/104 |
| 2013/0221913 A1 * | 8/2013 | Kim | H02J 7/0042 |
| | | | 320/108 |
| 2014/0015329 A1 | 1/2014 | Widmer et al. | |
| 2014/0009178 A1 | 4/2014 | Hyodo | |
| 2014/0091634 A1 | 4/2014 | Mayo et al. | |
| 2014/0091755 A1 | 4/2014 | Walley et al. | |
| 2014/0197687 A1 | 7/2014 | Lin | |
| 2016/0248280 A1 * | 8/2016 | Ben-Shalom | H04B 5/0037 |

FOREIGN PATENT DOCUMENTS

| | | | | |
|---|---|---|---|---|
| CN | 103782485 A | | 5/2014 | |
| DE | 112012006861 | * | 5/2015 | ............ B60L 11/182 |
| EP | 2017940 A2 | | 1/2009 | |
| EP | 2602908 A1 | | 6/2013 | |
| EP | 3127215 A1 | | 2/2017 | |
| JP | H01157896 A | | 6/1989 | |
| JP | 2003263668 A | | 9/2003 | |
| JP | 2005345435 A | | 12/2005 | |
| JP | 2008-312294 | | 12/2008 | |
| JP | 2009112137 A | | 5/2009 | |
| JP | 2009118587 A | | 5/2009 | |
| JP | 2009-525715 | | 7/2009 | |
| JP | 2010239690 A | | 10/2010 | |
| JP | 2010538596 A | | 12/2010 | |
| JP | 2011193671 A | | 9/2011 | |
| JP | 2012175793 A | | 9/2012 | |
| JP | 2012533277 A | | 12/2012 | |
| JP | 2013542424 A | | 11/2013 | |
| JP | 2014027102 A | | 2/2014 | |
| JP | 2014126512 A | | 7/2014 | |
| JP | 2014526871 A | | 10/2014 | |
| JP | 2014222994 A | | 11/2014 | |
| JP | 2015046990 A | | 3/2015 | |
| JP | 2015136281 A | | 7/2015 | |
| KR | 10-20080094953 A | | 10/2008 | |
| WO | 8910030 A1 | | 10/1989 | |
| WO | 2005109598 A1 | | 11/2005 | |
| WO | 2008137996 A1 | | 11/2008 | |
| WO | WO 2008/108963 | | 12/2008 | |
| WO | 2009027674 A1 | | 3/2009 | |
| WO | 2009041058 A1 | | 4/2009 | |
| WO | WO 2009/081115 | | 7/2009 | |
| WO | WO 2010/093724 | | 8/2010 | |
| WO | 2013122483 A1 | | 8/2013 | |
| WO | WO 2013/165261 | | 11/2013 | |
| WO | 2013179394 A | | 12/2013 | |
| WO | 2014011776 A2 | | 1/2014 | |
| WO | 2014060871 A1 | | 4/2014 | |
| WO | 2014083015 A1 | | 6/2014 | |
| WO | 2014095722 A2 | | 6/2014 | |
| WO | WO 2014/070025 | | 8/2014 | |

OTHER PUBLICATIONS

International Preliminary Report on Patentability for International Application No. PCT/NZ2013/000196 dated May 5, 2015 (7 pages).
Chinese Office Action for CN Application No. 201380057861.7 dated Jan. 24, 2017 (16 pages), translation included.
European Examination Report for EP Application No. 13824231.6 dated Aug. 4, 2017 (4 pages).
Chinese Office Action for CN Application No. 2015-540633 dated Oct. 25, 2017 (6 pages).

* cited by examiner

INDUCTIVELY COUPLED POWER TRANSFER SYSTEMS

This application is a National Stage Application of PCT/NZ2013/000196, filed 5 Nov. 2013, which claims benefit of U.S. Provisional Ser. No. 61/722,564, filed 5 Nov. 2012 and which applications are incorporated herein by reference. To the extent appropriate, a claim of priority is made to each of the above disclosed applications.

FIELD OF THE INVENTION

This invention relates to inductively coupled power transfer methods and systems. More particularly, although not exclusively, the invention relates to systems and methods for detecting devices and driving selected transmitter coils in multiple transmitter coil arrays.

BACKGROUND OF THE INVENTION

There is increasing interest in inductively coupled power transfer systems in which the power transmitter includes an array of transmitter coils beneath a charging surface that can accommodate a number of devices to be charged (commonly referred to as "charging mats"). Many systems use small transmitter coil areas which means that the charging devices have to be tightly coupled to a small area. When using a large number of transmitter coils flexible alignment is required to allow the device to be charged anywhere on the charging surface. Doing this requires a method to detect the presence of the device to be charged.

It is possible to detect the presence of a device to be charged via the transmitter coils as disclosed in the applicant's prior application U.S. Ser. No. 61/696,341 annexed hereto. This approach has the advantage that it can be used for any device and that the same coils that are used for charging may be used for detecting a power receiver too. However, this approach does require periodic scanning by the transmitter coils that consumes power, creates noise and EMIs and exposes driven components to higher usage. Scanning the transmitter coils may also result in voltage dropouts, which can increase the charging time of a device being charged.

Other systems require a specific engagement of elements to initiate charging. This is inconvenient as a user would simply like to place a device in a general area in any orientation. This approach may also limit the devices that may be charged.

Other systems may utilize communications from a device to be charged to the power transmitter to initiate power transfer. This requires matching communication capabilities between devices and so limits the range of potential devices that may utilize the power transmitter. This also adds cost to both the transmitter and receiver to have the required communications capability. A system with a complex array of optical sensors has also been proposed. This approach is complex and expensive.

It is an object of the invention to provide an inductively coupled power transfer system that overcomes at least some of these problems or that at least provides the public with a useful choice.

SUMMARY OF THE INVENTION

According to one exemplary embodiment there is provided in an inductively coupled power transfer system including an inductively coupled power transmitter having one or more transmitter coils proximate a charging surface and a device including an inductively coupled power receiver, a method of activating the inductively coupled power transmitter comprising:
  a. detecting a force applied by a device due to its placement on a charging surface to detect the presence of a device; and
  b. activating the inductively coupled power transmitter to transfer power to the device when a device is detected.

According to another exemplary embodiment there is provided in an inductively coupled power transfer system including an inductively coupled power transmitter having a plurality of transmitter coils proximate a charging surface and a device including an inductively coupled power receiver, a method of activating the inductively coupled power transmitter comprising:
  a. detecting the presence of a device proximate to the charging surface utilizing one or more detection coils having an area much greater than that of each transmitter coil; and
  b. activating the inductively coupled power transmitter to transfer power to the device when a device is detected.

According to another exemplary embodiment there is provided an inductively coupled power transmitter having one or more transmitter coils suitable for transferring power to an inductively coupled power receiver of a device and a force detector that detects the presence of a potential device by monitoring forces applied to a surface of the power transmitter and activates the inductively coupled power transmitter upon detection of a potential device.

According to another exemplary embodiment there is provided an inductively coupled power transmitter having one or more transmitter coils suitable for transferring power to an inductively coupled power receiver of a device and a proximity detector that detects the presence and location of a potential device by monitoring the proximity of devices to a surface of the power transmitter and activates the inductively coupled power transmitter upon detection of a potential device.

According to another exemplary embodiment there is provided an inductively coupled power transmitter having one or more transmitter coils suitable for transferring power to an inductively coupled power receiver of a device and one or more detection coils each having an area much greater than that of the transmitter coils for detecting the presence of a potential device and activating the inductively coupled power transmitter.

According to another exemplary embodiment there is provided in an inductively coupled power transfer system including an inductively coupled power transmitter having a plurality of transmitter coils proximate a charging surface and a device including an inductively coupled power receiver positioned on the charging surface, a method of selectively energizing selected transmitter coils comprising selecting a plurality of transmitter coil combinations and selecting the combination providing the coupling between the power transmitter and the power receiver meeting a selection criteria.

According to another exemplary embodiment there is provided an inductively coupled power transmitter for an inductively coupled power transfer system including a plurality of transmitter coils proximate a charging surface and a controller for selectively driving and monitoring the transmitter coils wherein the controller selectively energizes a plurality of combinations of transmitter coils and monitors the coupling between the power transmitter and a power receiver and during power transfer drives the combination of transmitter coils that has the coupling with the power receiver meeting a selection criteria.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of exemplary embodiments given below, serve to explain the principles of the invention.

DETAILED DESCRIPTION OF EMBODIMENTS OF THE INVENTION

The various aspects of the present invention will be described with reference to an embodiment utilizing a charging surface but it is to be appreciated that certain aspects are not limited to this type of power transmitter.

Figure 1:
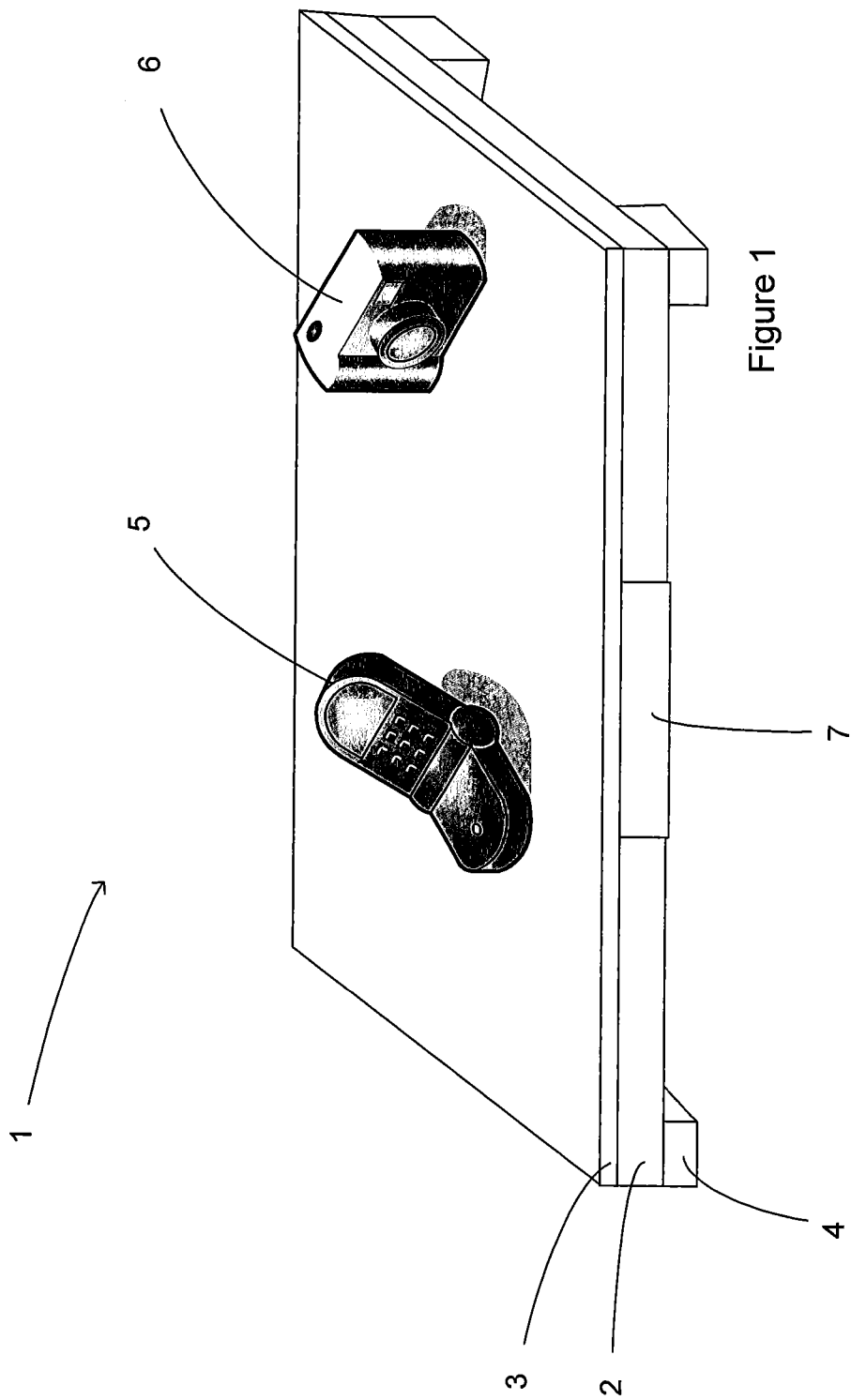
FIG. 1 shows an inductively coupled power transmitter with devices to be charged placed thereon.

In FIG. 1 there is shown an inductively coupled power transfer system including an inductively coupled power transmitter 1 supporting devices in the form of a phone 5 and camera 6 on charging surface 3. It will be appreciated that the invention may be applied to a wide range of power receiving devices. It will also be appreciated that devices 5 and 6 will typically include an inductively coupled power receiver including a pickup coil and a power receiving circuit and a rechargeable battery such as described in the applicant's prior application U.S. Ser. No. 61/720,108.

In this embodiment the inductively coupled power transmitter 1 includes a base 2 supported on legs 4 (optional) that contains a power transmitting circuit 7 (typically an inverter driving the transmission coils with a microcontroller and a switching circuit to selectively activate coils to be driven).

Figure 2:
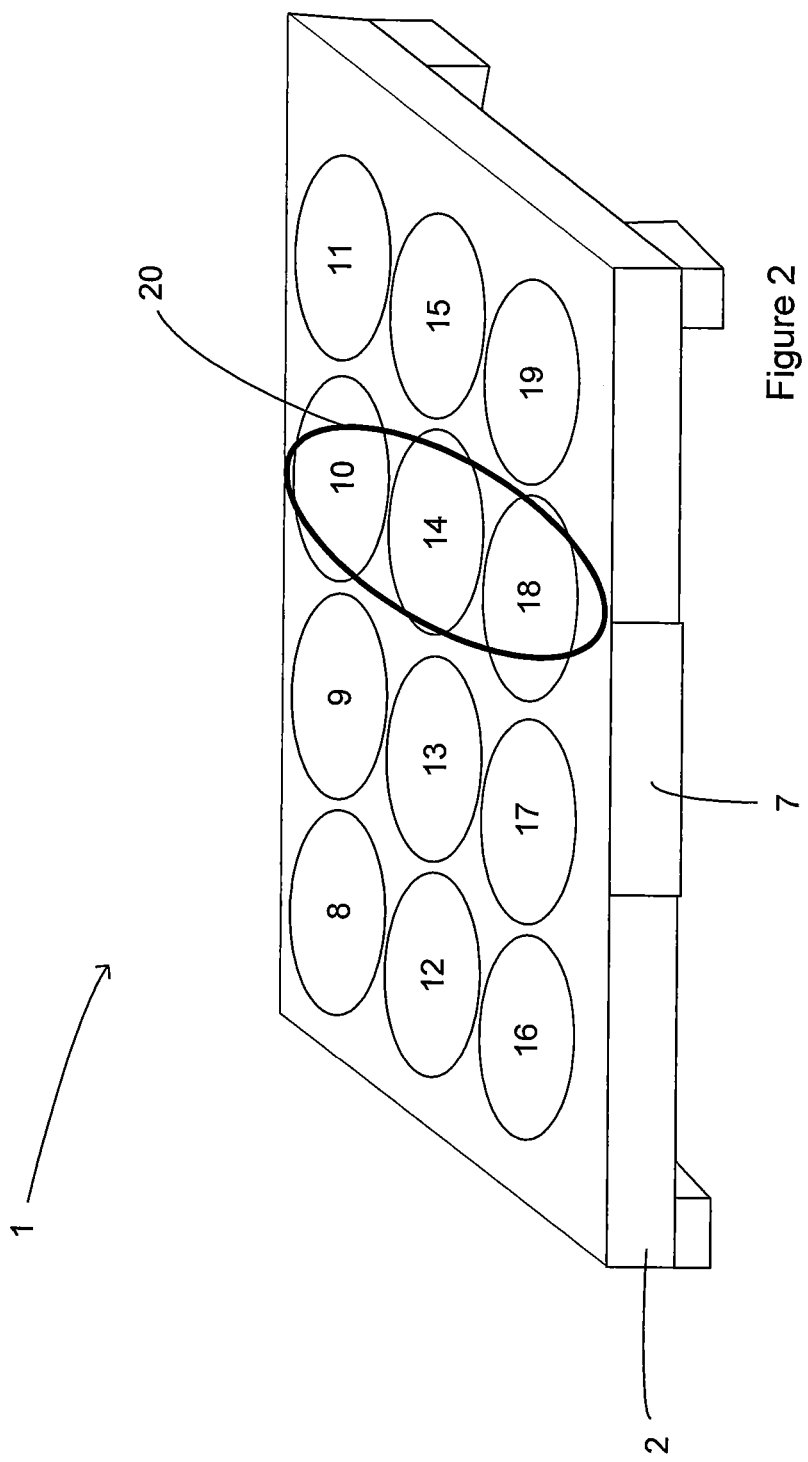
FIG. 2 shows the inductively coupled power transmitter of FIG. 1 with the charging surface removed to reveal the transmitter coils with a receiver coil of a device to be charged overlaid.

FIG. 2 shows the charging surface 3 removed to expose the underlying transmission coils 8 to 19 to aid description of the operation of the power transmitter. Whilst 12 coils are shown in this embodiment it will be appreciated that the number of transmission coils could be anything from a few to hundreds. The coils may advantageously be arranged in a honeycomb pattern to achieve greater coil density but are shown as a simple array in the figures for simplicity.

As mentioned in the background known methods of activating a power transmitter may be wasteful of energy, complex, expensive, noisy etc. According to one aspect the power transmitter may be activated by detecting a force associated with a device being placed on the charging surface 3. "Activated" in this sense means to wake up the power transmitter from a standby state if inactive or to cause it to perform further detection if the power transmitter is already active.

In one embodiment one or more load cells may be provided (for example in one or more feet 4) that supplies a signal to power transmitting circuit 7.

A change in an applied static force due to a device being placed on or removed from the charging surface 3 may trigger the transmitting circuit to perform further detection using the transmission coils. This may be a single scanning step or a coarse scan followed by a fine scan etc.

In another embodiment an accelerometer may be included in power transmitting circuit 7 (or some other position). An applied dynamic force due to a device being placed on or removed from the charging surface 3 may trigger the transmitting circuit to perform further detection using the transmission coils as above.

Figure 6:
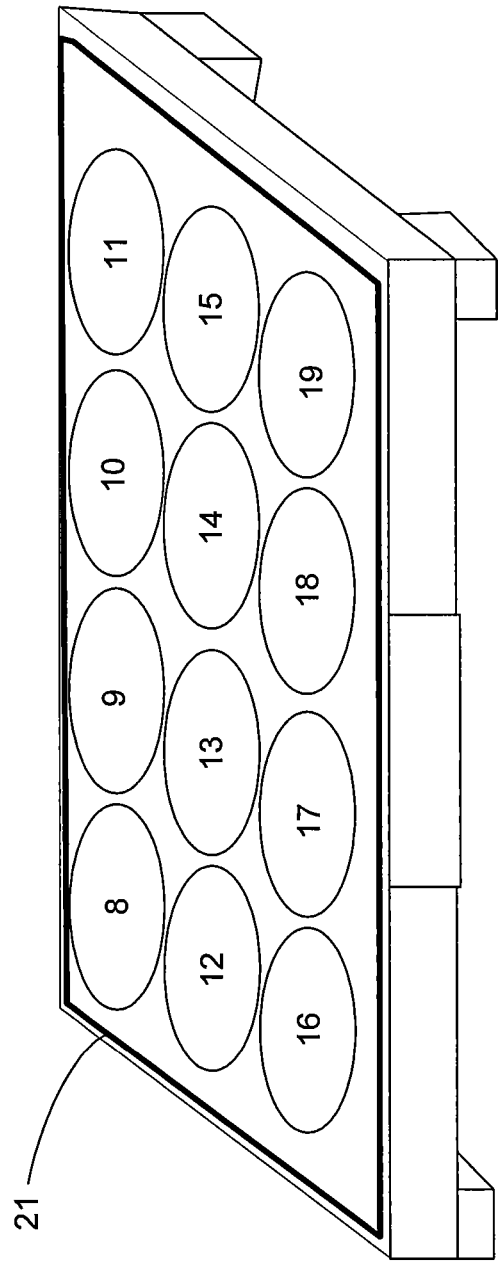
FIG. 6 shows the inductively coupled power transmitter of FIG. 2 including a detection coil around the periphery.

In another embodiment as illustrated in FIG. 6 a large detection coil 21 may be provided to detect the presence of one or more devices. In this example a single coil 21 encompasses all transmitter coils 8 to 19. The detection coil 21 is much larger than the area of a power transmitter coils 8 to 19, at least three times the area of a single coil. The detection coil 21 is driven by the transmitter circuit to detect devices on charging surface 3. The detection coil 21 could also be used for near field communications with devices.

By using a coil 21 in the form of a large loop antenna around the perimeter of the charging area it is possible to detect a change in the objects present in the charging area. Using a push-pull convertor and tuned circuit of the transmitter circuit 7 with the loop antenna 21 will produce a certain frequency depending on the objects present. In one specific embodiment the time taken for a number of zero crossings, say 1000, may be measured and a significant change may be used to activate the power transmitter. Alternately, the number of zero crossings that occur in a period of time, say 10 ms may be counted. By using a large number of cycles (rather than a single cycle) greater accuracy can be achieved and this allows the detection system to continue to operate in the presence of noise from the transmitter coil array.

This method can lower the quiescent power draw of the power transmitter when no receivers are present whilst still allowing rapid detection of a power receiver.

Figure 7:
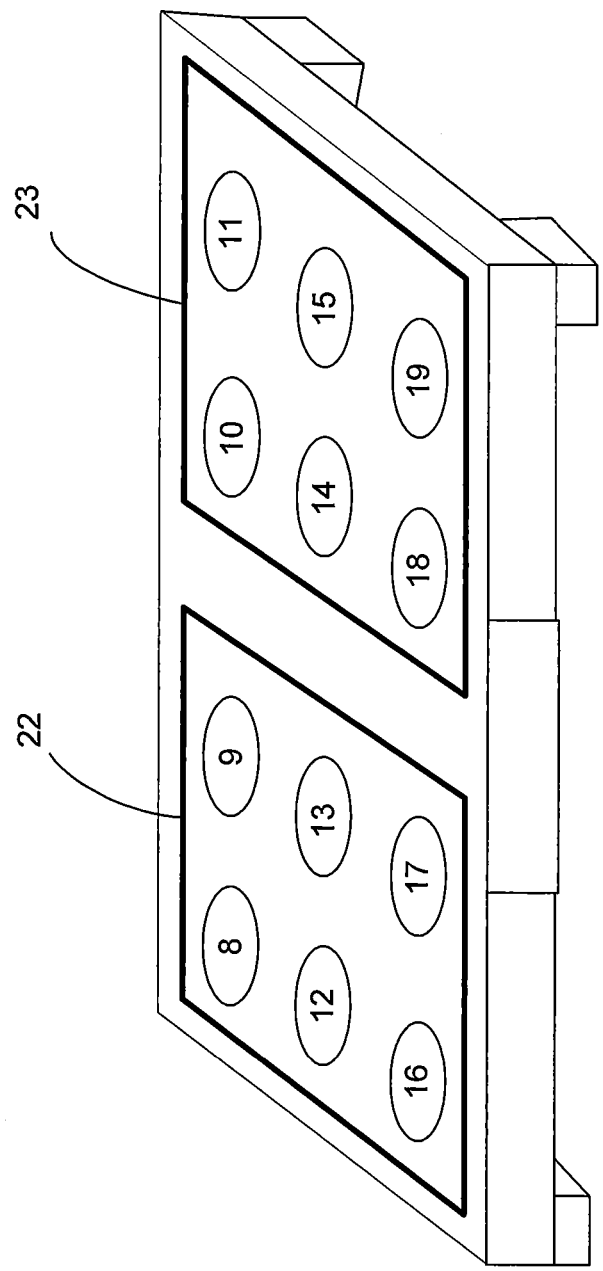
FIG. 7 shows the inductively coupled power transmitter of FIG. 2 including a pair of detection coils.

In another embodiment as shown in FIG. 7 two detection coils 22 and 23 are employed. This localizes the scanning disturbance to one area of the charging surface and assists in locating the position of a detected device (i.e., full scanning is only required within the coil 22 or 23 that makes a positive detection).

In another embodiment the charging surface 3 may incorporate a capacitive or resistive touch type sensor that can detect the presence and location of a device on the charging surface. This approach has the advantage that positional information may be obtained to assist in determining the transmitter coil combination to be driven as described below.

The above detection methods can be used to detect whether a receiver has been added or removed in the charging area, which can trigger other tests to determine which receivers are still present and which charging coils to energise.

Following detection of a device according to one of the techniques above (or when the power transmitter is activated in some other way—such as periodic activation) the following methods may be employed to determine a selected combination of transmitter coils to drive to supply power to a power receiver.

Referring now to FIG. 2 a method of developing a combination of transmitter coils to drive to transfer power to coil 20 of a power receiver of a device will be described. In this example the receiving coil 20 is seen to be elliptical and it will be appreciated that receiving coils may have a range of geometries including generally rectangular, circular etc. In this embodiment the receiving coil 20 is elongate and larger than the transmitter coils 8 to 19.

Once a power transmitter has been activated a scan may be performed using the transmitter coils to evaluate coupling between selected transmitter coils and a receiver coil (or several coils if there are several devices or a receiver has several coils). A detailed scan may be conducted for every scan or a coarse scan may be performed to determine the general location of a receiver coil and a detailed scan may then be performed within the general location to determine a combination of coils to be driven for each receiving coil. An effective technique for performing such evaluation is by measuring inrush current as described in U.S. Ser. No. 61/696,341 annexed hereto.

Figure 3:
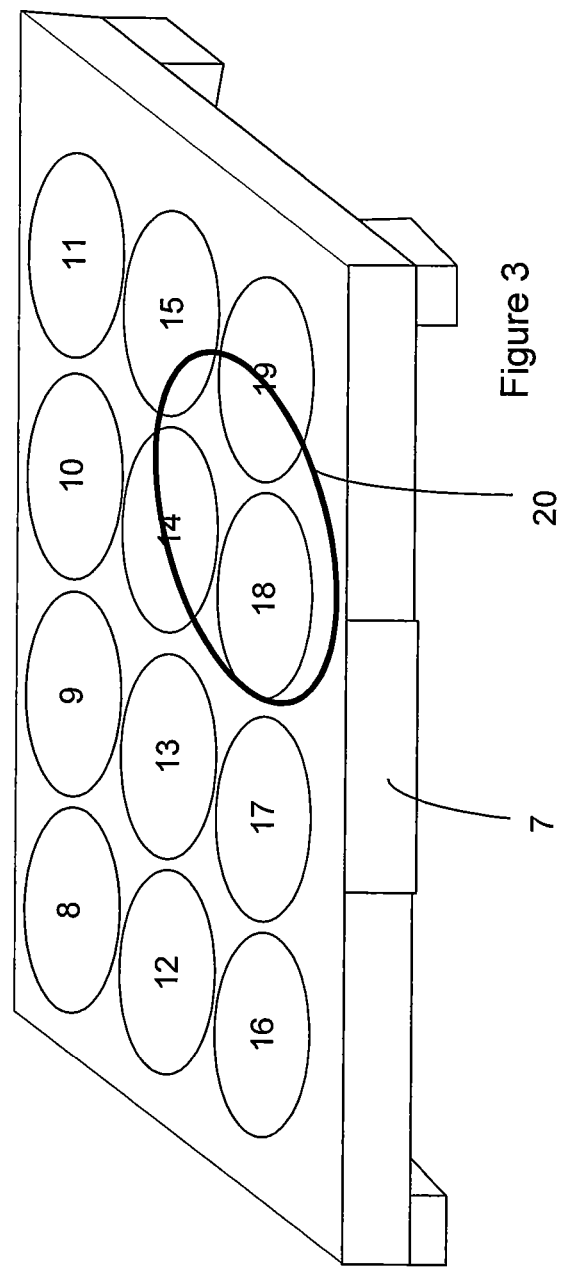
FIG. 3 shows the inductively coupled power transmitter of FIG. 2 with the receiver coil in another orientation.
Figure 4:
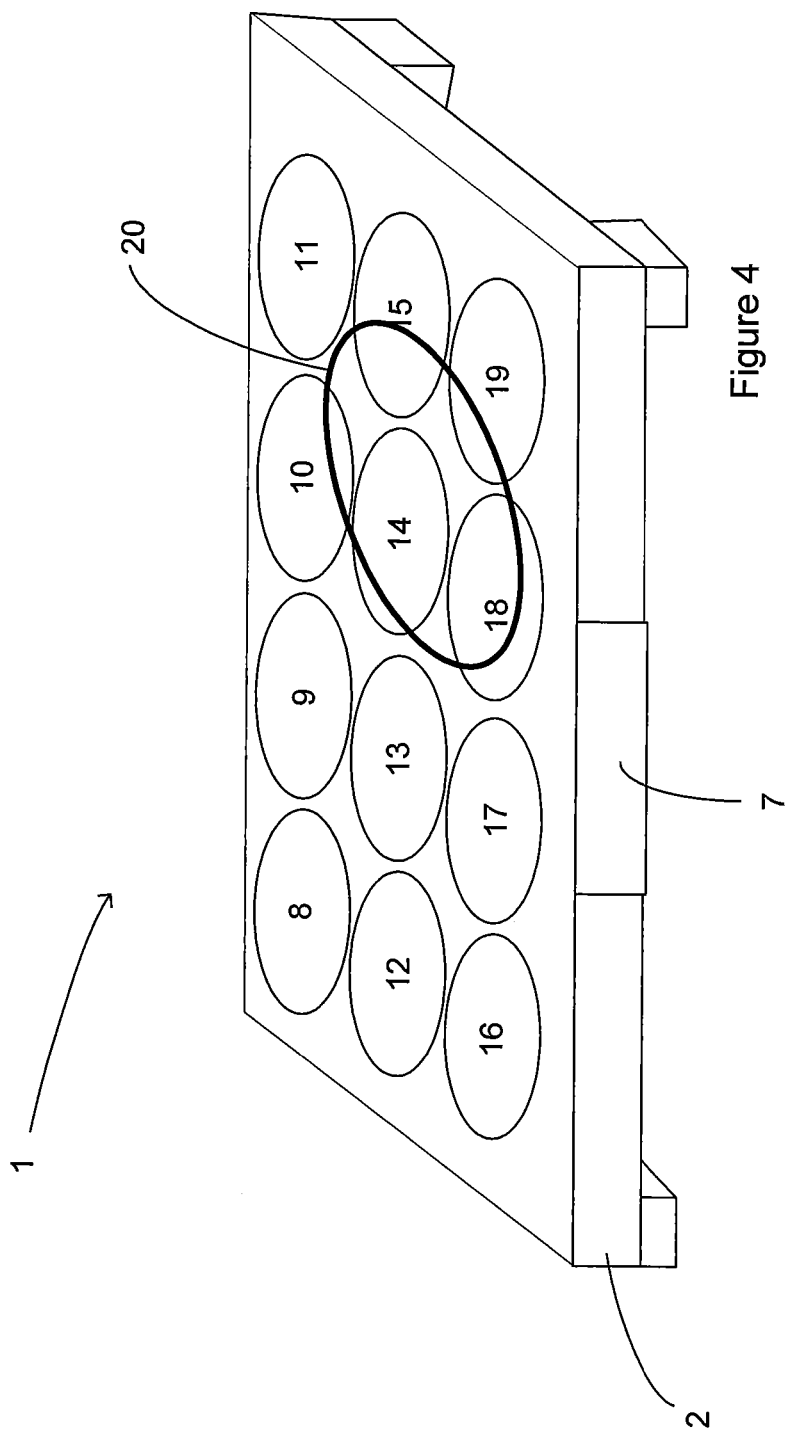
FIG. 4 shows the inductively coupled power transmitter of FIG. 2 with the receiver coil in another orientation.

According to a first method the inrush current is measured for all possible coil combinations and the combination meeting the selection criterion is selected. Due to the geometries of the transmitter and receiver coils in this embodiment combinations of three transmitter coils are assessed. In this embodiment the selection criterion is the coil combination having the highest inrush current. In the example shown in FIG. 2 coils 10, 14 and 18 will have the highest inrush current and this combination will be driven. In the example shown in FIG. 3 coils 14, 18 and 19 will produce the greatest inrush current and so will be driven. In the example shown in FIG. 4 coils 14, 15 and 18 will produce the greatest inrush current and so will be driven. It will be appreciated that depending upon the geometries of the transmitter coils and receiver coil(s) a wide range of transmitter coil geometries may be employed as the combination of transmitter coils to supply power to a receiver coil.

In a modification to this method the geometry of transmitter coil configurations may be restricted for a first coarse scan and once the general location of a receiving coil is established a detailed scan in that general location may be conducted. For example the geometry of the coil configurations may initially be restricted to linear arrays of three transmitter coils in one orientation (e.g. coils 8, 12, 16 etc.). Once the general location is established by finding the coil combinations with the highest inrush current then the inrush current of all possible coil combinations in the general location may be tested to find the best transmitter coil combination.

The first coarse scan may proceed in a number of levels. Initially a number of widely spaced coils across the transmitter coil array may be tested and coils proximate the coil with the highest inrush current may then be tested so as to scan the transmitter coil array in ever increasing detail.

In another embodiment the inrush current of all individual transmitter coils may be measured to find the general location of the receiver coil and then the best combination of coils determined. This could be as above where the inrush current of all possible coil combinations in the general location is tested to find the best coil combination. Alternatively the three coils with the highest inrush current could be selected. Alternatively the coil with the highest inrush current could be selected, then all adjacent coils tested in combination with the selected coil and finally the selected pair of coils may be tested in combination with all surrounding coils to find the three best coils.

It will be appreciated that where the location of a device is known to a certain level of precision (such as when charging surface 3 incorporates a capacitive or resistive touch type sensor) then scanning using transmitter coils may be confined to that location, or if location is precise enough it may be used to determine the drive coil combination.

Figure 5:
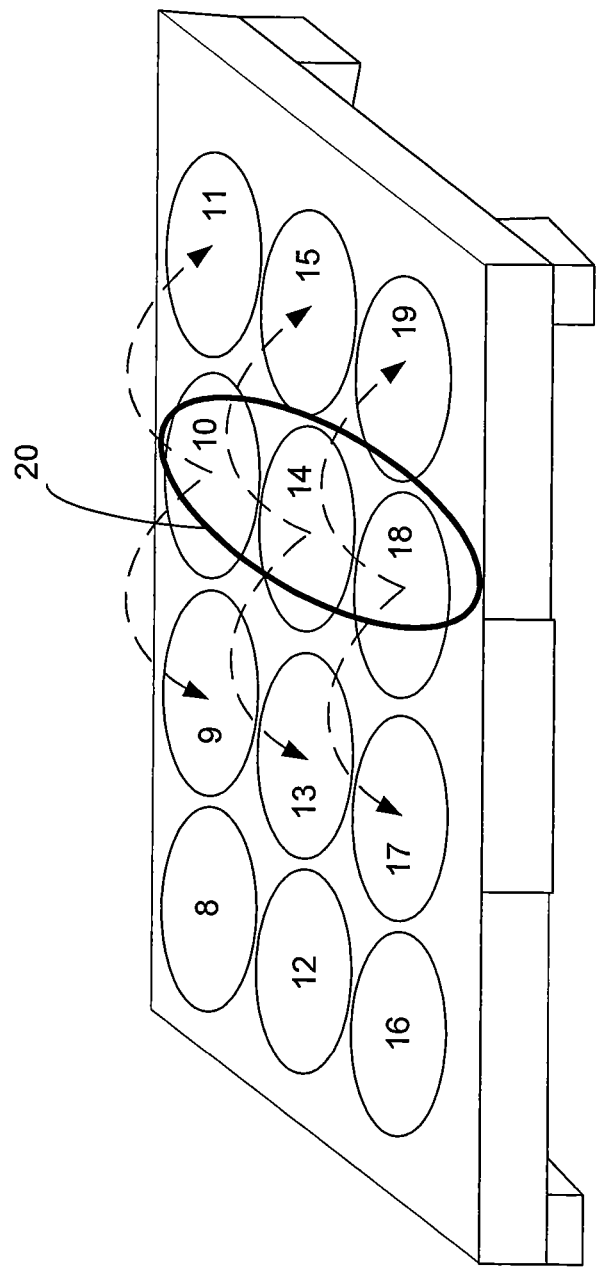
FIG. 5 shows the inductively coupled power transmitter of FIG. 2 with transmitter coils driven with opposite polarity.

FIG. 5 shows a modification to the transmitter coil drive configuration described above. In this example coils 10, 14 and 18 were determined to be the coils producing the highest inrush current. In this embodiment coils 10, 14 and 18 are driven with a common polarity and adjacent coils 9, 13, 17, 11, 15 and 19 are driven with an opposite polarity (i.e. an out of phase alternating drive signal). In this way a stronger magnetic flux may be generated to increase power transfer.

Whilst the power transmitter is already charging a device a modified approach may be desirable. A further device being placed on charging surface 3 may be detected by a force associated with placement of the device or using a detection coil 21 or 22 and 23 or other similar means. Alternatively a further device could be sensed using the transmitter coils 8 to 19 but this interrupts charging whilst the transmitter coils transferring power must be powered down. Alternatively a hybrid approach may be adopted where both methods are employed but the transmitter coils are only scanned infrequently to minimise disruption of charging.

Where the transmitter coils are scanned for inrush current the inverter driving the switching coils may be switched off and inrush current tests conducted for the coils or combinations of coils to be tested. The coil combinations with the best coupling (potentially several combinations of coils for several devices) are selected by the switching circuit and the inverter powered on again. This ensures that the power dropout to the power receivers is kept to a minimum.

Alternatively where power is being transferred to a coupled power receiver the active transmitter coils may be kept active except for one coil of the combination at a time so that the difference attributable to that coil may be assessed. In this case the inrush current for one specific device can be measured without powering down all other devices in the meantime. The length of time that the inverter is switched off before the inrush test is executed may be varied. As the inrush test needs the receiver capacitance to be discharged to a fairly low level, the inverter needs to be switched off long enough for the capacitance to discharge, but short enough to minimise the voltage dropout at the receiver. This can be realised by running the test multiple times and increasing the power off time until a positive inrush test result is obtained. If no positive inrush result is obtained, the coupled coils are deemed to be no longer coupled to a receiver and the coils can be removed from the array of energised coils.

The test frequencies used for current inrush tests may be selected to ensure the maximum inrush current for a tuned receiver at different heights above the charging surface (for example tests may be run for minimum and maximum height values at between say 270 kHz and 300 kHz). If the inrush current is above a certain threshold, then it may indicate that a receiver is present. A foreign object test may also be conducted to detect any metal object placed on the charging surface and to avoid activating coils proximate it. When testing inrush current over a range of frequencies a metal object will have a relatively flat profile unlike a power receiver that will have a discernable peak over the frequency range.

It will be appreciated that the optimal number, shape and position of the enabled transmitter coils to turn on may vary for different receiver coil sizes (eg. tablet, phone, camera etc.). By increasing the number of enabled transmitter coils until the inrush current or power draw stops increasing an effective transmitter coil combination may be determined in each case.

To determine the status of devices charging the steady state current of the inverter may be periodically measured to determine a change in the power draw of all coupled receivers. The initial current draw through the inverter may be measured and used as a reference value. Periodically (say every second or so) the inverter current may again be measured and compared to the reference value. If the difference is above a pre-defined threshold then the transmitter coils may be scanned to measure inrush current to determine which receivers require power transfer. If the difference is less than the threshold, the new measurement may be stored as the new reference value (which will help track small current variances as the batteries charge), or the initial reference value may be maintained. The current change could indicate either a receiver being removed or a battery charge state changing. This can help minimise voltage dropouts using the inrush tests and minimise the number of times the full detection method is required (and hence further voltage dropouts).

The current change test above won't be able to detect a receiver being added to the charging area, so using the detector coil or other activation technique described above will indicate whether a new receiver has been added. Upon detection of a new device a full current inrush test may be performed to find the specific locations of all the power receivers on the charging area.

In order to drive the inverter driving the transmitter coils at the optimum level the power output by the power transmitter may be modified until an optimum is reached. The transmitter may keep increasing magnetic field strength generated by active transmitter coils until one or more power receiver stops accepting more power. Alternatively the transmitter may start at a maximum value and keep decreasing magnetic field strength generated by active transmitter coils until power draw drops or a maximum efficiency point is reached.

There is thus provided a power transmitter for an ICPT system having simple and power efficient activation with reduced noise and EMIs. There is also provided a method for optimising the combination of transmission coils for a given coil geometry and orientation.

While the present invention has been illustrated by the description of the embodiments thereof, and while the embodiments have been described in detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the applicant's general inventive concept.

The invention claimed is:

1. A wireless power transmitter comprising:
   a plurality of wireless power transmitter coils;
   a detector configured to detect a presence of a potential wireless power receiving device proximate a surface of the wireless power transmitter; and
   a controller configured to:
   in response to detecting the presence of the potential wireless power receiving device proximate the surface of the wireless power transmitter, perform a scan to evaluate coupling between the wireless power transmitter coils and one or more receiver coils, the scan including measuring inrush current, wherein more than one frequency is used for measuring inrush current;
   determine a type of the potential wireless power receiving device based on the measured inrush currents, wherein a wireless power receiving device is detected by a peak inrush current over a frequency range of the more than one frequency and wherein a foreign object is detected using a flat inrush current over the frequency range; and
   perform wireless power transfer using one or more of the plurality of wireless power transmitter coils based on the determined type of the potential wireless power receiving device.

2. The wireless power transmitter of claim 1, wherein the detector comprises a capacitive touch sensor.

3. The wireless power transmitter of claim 1, wherein the detector comprises a resistive touch sensor.

4. The wireless power transmitter of claim 1, wherein the detector comprises a detection coil having an area greater than at least one of the wireless power transmitter coils.

5. The wireless power transmitter of claim 4, wherein the detection coil encompasses more than one of the plurality of wireless power transmitter coils.

6. The wireless power transmitter of claim 5, wherein the detector comprises a plurality of detection coils and each detection coil encompasses more than one of the plurality of wireless power transmitter coils.

7. The wireless power transmitter of claim 4, wherein the controller is configured to:
   drive the detection coil; and
   identify the presence of the potential wireless power receiving device based on a detected frequency response of the detection coil.

8. The wireless power transmitter of claim 1, wherein the detector comprises a force detector.

9. The wireless power transmitter of claim 1, wherein the controller is configured to:
   provide wireless power transfer using one or more of the plurality of wireless power transmitter coils having the highest detected inrush current amongst the plurality of wireless power transmitter coils.

10. In a wireless power transmitter device having a plurality of wireless power transmitter coils, a method comprising:
    detecting a presence of a potential wireless power receiving device proximate a surface of the wireless power transmitter;
    in response to detecting the presence of the potential wireless power receiving device proximate the surface of the wireless power transmitter, performing a scan to evaluate coupling between the wireless power transmitter coils and one or more receiver coils, the scan including measuring inrush current, wherein more than one frequency is used for measuring inrush current;

determining a type of the potential wireless power receiving device based on the measured inrush currents, wherein a wireless power receiving device is detected by a peak inrush current over a frequency range of the more than one frequency and wherein a foreign object is detected using a flat inrush current over the frequency range; and performing wireless power transfer using one or more of the plurality of wireless power transmitter coils based on the determined type of the potential wireless power receiving device.

11. The method of claim 10, wherein detecting the presence of the potential wireless power receiving device comprises detecting a change in capacitance using a capacitive touch sensor.

12. The method of claim 10, wherein detecting the presence of the potential wireless power receiving device comprises detecting a change in resistance using a resistive touch sensor.

13. The method of claim 10, wherein detecting the presence of the potential wireless power receiving device comprises:

driving a detection coil; and detecting the presence of the potential wireless power receiving device based on a detected frequency response of the detection coil.

14. The method of claim 10, wherein detecting the presence of the potential wireless power receiving device comprises detecting a force using a force sensor.

15. The method of claim 10, wherein performing wireless power transfer using one or more of the plurality of wireless power transmitter coils comprises performing wireless power transfer using one or more of the plurality of wireless power transmitter coils having the highest detected inrush current amongst the plurality of wireless power transmitter coils.

* * * * *